3,539,625
PHOSPHOCREATINE SALTS
Joseph Nordmann, Paris, and Henri Blaise Swierkot, Bondy, France, assignors to Ugine Kuhlmann, Paris, France
No Drawing. Filed Apr. 10, 1967, Ser. No. 629,395
Claims priority, application France, Apr. 8, 1966, 57,037
Int. Cl. C07c *101/12*
U.S. Cl. 260—534                                          1 Claim

ABSTRACT OF THE DISCLOSURE

The present invention concerns the salts of phosphocreatine with potassium, magnesium, barium, lithium or an organic base. It also concerns a process for the treatment of fatigue in human beings which comprises administering a salt of phosphocreatine with potassium, magnesium, barium, lithium or an organic base or any mixture of such salts. The invention also includes (a) a process for the preparation of the salts of phosphocreatine with potassium, magnesium, barium or lithium which compirses the hydrogenolysis of dibenzyloxyphosphorylcreatinine in the presence of potassium, magnesium, barium or lithium hydroxide respectively followed by opening of the lactam ring, (b) a process for the preparation of the salts of phosphocreatine with magnesium or barium which comprises a double decomposition between a soluble salt of phosphocreatine and a soluble salt of magnesium or barium, (c) a process for the preparation of the salts of phosphocreatine with an organic base which comprises a double decomposition between an alkali metal salt of phosphocreatine and an orotate of an organic base, and (d) a process for the preparation of the salts of phosphocreatine with potassium, magnesium, barium, lithium or an organic base which comprises cation exchange by passage over ion exchange resin.

---

The present invention concerns new phosphocreatine salts.

It is known that phosphocreatine, for example as the disodium salt, acts on various types of fatigue and muscular and metabolic complaints.

The new phosphocreatine salts of this invention are salts of phosphocreatine with potassium, magnesium, barium, lithium, or an organic base.

These salts have anti-fatigue properties, have an interesting action on the myocardium and can also be used in geriatrices.

To prepare these salts, the starting point may be the sodium salt of phosphocreatine using the conventional methods of cation exchange, but the following methods have been shown to be particularly advantageous:

Hydrogenolysis of dibenzyloxyphosphorylcreatinine in the presence of a metallic hydroxide, following by opening of the lactam ring;

Double decomposition between a soluble salt of phosphocreatine and a soluble salt of an alkaline earth metal;

Double decomposition between an alkali metal salt of phosphocreatine and an orotate of an organic base;

Cation exchange by passage over ion exchange resin.

The invention is illustrated by, but not limited to, the following examples in which the parts are parts by weight unless the contrary is stated.

EXAMPLE 1

112 parts of dibenzyloxyphosphorylcreatinine (prepared according to French Patent No. 1,211,099) are dissolved in 300 parts by volume of 2 N caustic potash in a catalytic hydrogenation shaker apparatus. The catalyst is prepared separately by hydrogenating a mixture of 5.58 parts of palladium chloride, 56 parts of active charcoal (norite) and 280 parts of water. After filtering off and washing, the catalyst is mixed with the solution of dibenzyloxyphosphorylcreatinine. The dibenzyloxyphosphorylcreatinine is then hydrogenated at ordinary room temperature and pressure. 13,440 parts by volume of hydrogen are absorbed in 2 hours. After filtering off the catalyst, 39.8 parts of caustic potash dissolved in 411 parts of water are added to the filtrate. The solution is heated rapidly for 10 minutes in order to obtain an internal temperature of 80° C. It is then rapidly cooled and neutralised to a pH of 7.6 by normal hydrochloric acid solution. 2,800 parts by volume of alcohol which has been made slightly alkaline are added. The oil thus obtained is separated by decanting, washed twice with 100 parts of 80% ethyl alcohol and finally taken up in 500 parts of isopropyl alcohol. After a long mechanical agitation (4 hours), the potassium salt slowly crystallises. It is filtered off and washed with isopropyl alcohol, dried over phosphorus pentoxide in vacuum and finally in air, until its weight is constant. 60 parts of the potassium salt of phosphocreatine crystallising with two molecules of water are thus obtained (it may also crystallise with 4 molecules of water according to the temperature at which crystallisation takes place).

*Analysis.*—Calculated for $C_4H_8N_3O_5PK_2+2H_2O$ (percent): P, 9.59; K, 24.15. Found (percent): P, 9.45; K, 23.86.

The barium salt of phosphocreatine which crystallises with one molecule of water, and the lithium salt of phosphocreatine, which crystallises without water, can be prepared in the same way except that in one case barium hydroxide is used in place of potassium hydroxide and in the other case one uses lithium hydroxide.

EXAMPLE 2

A solution of 54.4 parts of the sodium salt of phosphocreatine with 6 molecules of water of crystallisation in 155 parts of water, and a solution of 65.7 parts of magnesium bromide with 6 molecules of water of crystallisation in 70 parts of water are prepared. The two solutions are mixed at the ambient temperature. After reacting for ten minutes 675 parts of ethyl alcohol are added. The gummy precipitate thus obtained is treated with 200 parts of isopropyl alcohol, when it crystallises. The crystals are dried in vacuo over phosphorus pentoxide and then in air until their weight is constant. 45 parts of the magnesium salt of phosphocreatine are thus obtained.

*Analysis.*—Calculated for $C_4H_8N_3O_5PMg+4H_2O$ (percent): C, 15.73; H, 5.24; P, 10.16; Mg, 7.86. Found (percent: C, 15.67; H, 5.55; P, 10.10; Mg, 7.92.

The course of the neutralisation curve corresponds to that of phosphocreatine.

EXAMPLE 3

A solution of 10.89 parts of the sodium salt of phosphocreatine in 70 parts of water is reacted in the cold with a solution of 15.54 parts of choline orotate in 78 parts of water. A copious precipitate of sodium orotate is immediately produced and is filtered off after standing for 3 hours. The filtrate is first concentrated in a vacuum of 10 mm. of mercury without the temperature of the water bath exceeding 25° C., then under a vacuum down to 0.1 mm. of mercury until its weight is constant. The choline salt of phosphocreatine thus obtained is in the form of a viscous and hygroscopic oil. It is homogeneous from the chromatographic aspect, and its neutralisation curve is characteristic of phosphocreatine.

EXAMPLE 4

A solution of 10.89 parts of the sodium salt of phosphocreatine in 50 parts of water is added in the cold to a solution of 18.12 parts of lysine orotate in 150 parts of water. The procedure is then as in the process described in Example 3. The lysine salt of phosphocreatine thus obtained is in the form of a creamy white hygroscopic powder. The neutralisation curve and the paper chromatographic analysis conform to the characteristics of phosphrocreatine.

EXAMPLE 5

A solution of 9.97 parts of the sodium salts of phosphocreatine in 45 parts of water is reacted in the cold with a solution of 21.56 parts of procaine orottae in 65 parts of water and the procedure is then according to Example 3. A creamy white, hygroscopic solid of the procaine salt of phosphocreatine is obtained.

*Analysis.*—Calculated for $C_{30}H_{50}H_7O_9P$ (percent): N, 14.34; P, 4.53. Found (percent): N, 14.54; P, 4.39.

In paper chromatographic analysis the spots obtained are those of phosphocreatine.

TOXICOLOGICAL PROPERTIES

The compounds described have been shown experimentally to have very little toxicity. For example, the magnesium salt of phosphocreatine when administered orally to mice of C.57 strain has a maximum nontoxic dose greater than 5 g./kg. The essential symptoms of toxicity at this dose are excitement and emaciation of the animals.

PHARMACOLOGICAL PROPERTIES

The pharmacological properties of this compound have been studied on the cardiac muscle with the test of the detached frog heart perfused with Ringer-Locke liquid. At doses of $5 \times 10^{-5}$ g. per litre it is thereby found that the magnesium salt of phosphocreatine causes an increase in the amplitude of the contractions and a slight acceleration of the rhythm. These positive chronotropic and inotropic actions are on a par with a tonotropy.

With stronger doses, these pharmacological effects are amplified and then lead to bradycardia and auriculoventricular dissocation. It is surprising to note that the latter disappears instantaneously following a washing of the heart with the perfusion liquid, which enables the conclusion to be drawn that the maximum action does not reach to the cellular level, the heart regaining an entirely normal activity in spite of the previous overloading.

It may then be estimated that the effects of the products which are manifested on the cardiac contraction show an action which is manifested chiefly at the myocardiac level.

When the dilysine salt of phosphocreatine is perfused in the same way, then at doses of $10^{-4}$ and $10^{-3}$ g./litre, that is at high concentrations, there are observed modifications in the rhythm, with bradycardia, rapid and disordered vermicular movements of the auricle advancing towards auricular fibrillation. This auriculo-ventricular dissocation is labile, however, since it gives way immediately and completely when the heart is washed with the perfusion liquid and the graphs show that the heart goes back to an activity which is in every way comparable to the normal. This fact is proof of a strong pharmacological activity which has the advantage of not reaching the cellular functions.

At small doses of $10^{-5}$ g./litre the tonotropic function remains constant and the chronotropic function quietly gives way. The inotropic function is positive and is characterised by a better dissociation of the contractions of the ventricle and the auricle which are more strongly marked, proof of a pharmacological action on the mechanism of the contraction of the cardiac muscle.

In order to study the action of the products of the invention on fatigue, the test known as "the compulsory swimming test" was used.

Mice are plunged into an annular tank three-quarters filled with water kept at a temperature of 24–25° C. The natural reaction of the animals is to swim until they are exhausted. In order to increase the muscular fatigue and to prevent some of the animals from trying to slow up their effort a small lead shot weighing 400 mg. is fixed on each side of the base of the neck which compels the mice to make an effort to keep their heads above the water and to swim without stopping to the limit of their strength. They are quickly taken out of the water and dried as soon as they show a tendency to let themselves sink.

Twenty-five mice are subjected to this swimming test in groups of 5; the swimming time of each is noted and also the general behaviour of the animals. The test is repeated on the same animals 48 hours later.

This test when carried out under identical conditions, in one case on untreated mice and in the other case on mice which have received the product to be tested, enables the action of the latter on muscular fatigue to be evaluated by comparing the frequency histograms and average swimming times and possibly the action of the product on the nervous fatigue of animals usually distressed and panic-stricken through fear of drowning.

Under these conditions, all the products studied are shown to be remarkably active. For example, for mice to which the dilysine salt had been administered at a dose of 0.7770 g./kg./day in their drinking water for 14 days before the test, the first swimming time was four times greater than that of the control animals, while the second swimming time was practically identical with the time of the control animals.

Finally, the magnesium salt administered under the same conditions at a dose of 0.466 g./kg./day also gave a very good result, both for the first and for the second time of swimming.

Therapeutically, the salts of the invention may be used either separately or in association, for example taken orally in the form of cachets, pills or lozenges containing for instance 50 to 500 mg. at the rate of 1 to 10 per day. They may also be administered parenterally by intravenous or intramuscular injection and be made up for this use in injectable ampules or in lyophilised preparations for putting in extemporaneous solution.

We claim:
1. The salt of phosphocreatine with magnesium.

References Cited

Saev, G. K.: Chemical Abstracts (1964), vol. 60, pages 3259G to 3260A relied on.

Anatol, A.: Chemical Abstracts (1963), vol. 57, page 576G–H relied on.

LORRAINE A. WEINBERGER, Primary Examiner

L. A. THAXTON, Assistant Examiner

U.S. Cl. X.R.

260—239.3, 472, 501.11; 424—220